Feb. 27, 1968  G. DEMOS  3,370,311
TRI-LEVEL LOADER AND UNLOADER FOR AUTOMOTIVE VEHICLES
Filed Feb. 10, 1966  2 Sheets-Sheet 1
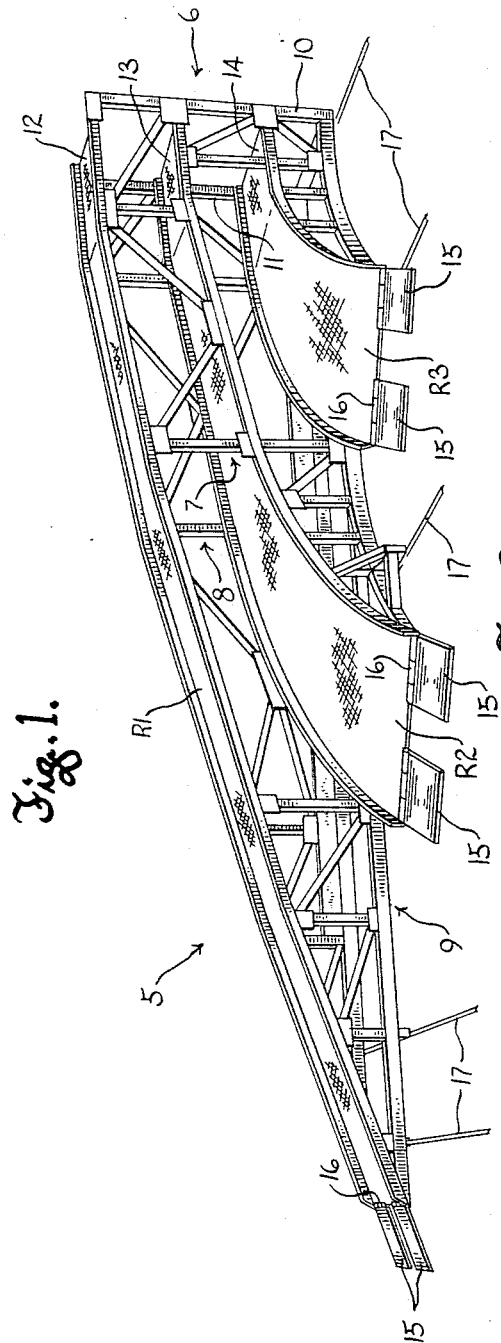
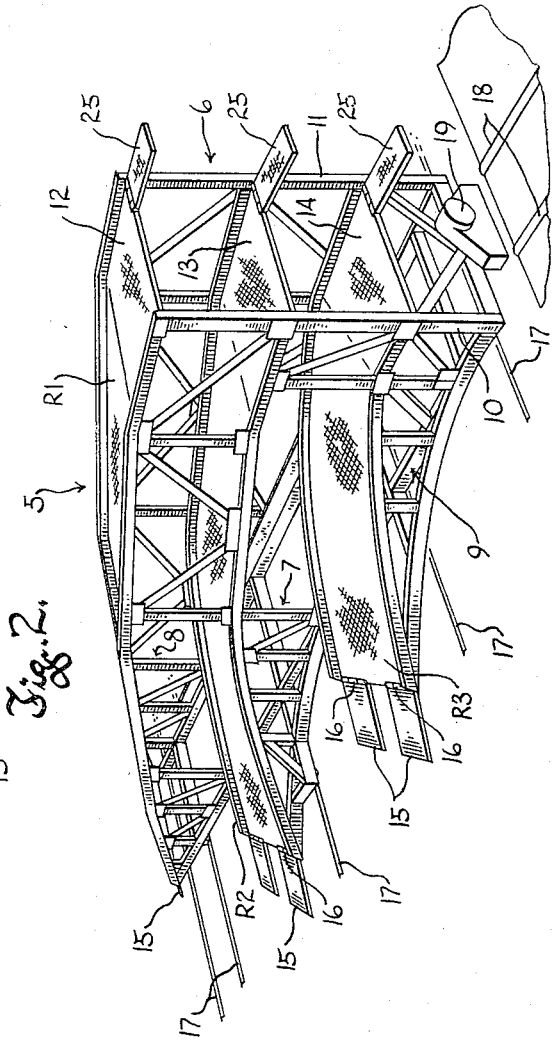
George Demos

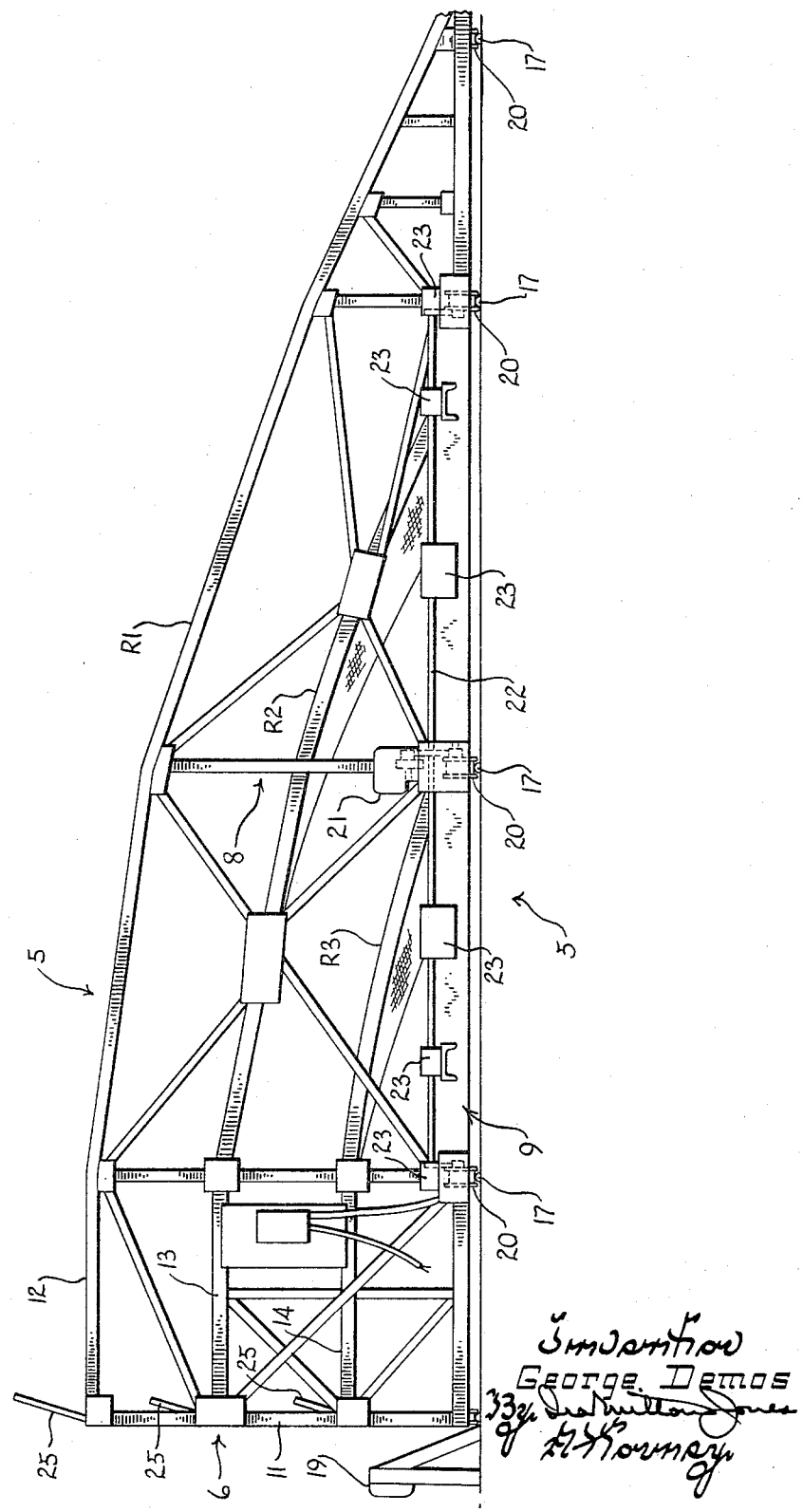

United States Patent Office 3,370,311
Patented Feb. 27, 1968

3,370,311
TRI-LEVEL LOADER AND UNLOADER FOR AUTOMOTIVE VEHICLES
George Demos, 4519 76th St., Racine, Wis. 53402
Filed Feb. 10, 1966, Ser. No. 526,518
6 Claims. (Cl. 14—72)

ABSTRACT OF THE DISCLOSURE

Automotive vehicles can be simultaneously loaded onto or unloaded from triple deck railroad cars by means of a supporting structure having superimposed top, bottom and intermediate decks at its front and separate inclined ramps for said decks, all of which extend downwardly and rearwardly therefrom. Two of said ramps have lower portions which extend laterally outwardly from the supporting structure to provide side entrances for the decks to which they lead.

---

This invention concerns ramp structures of the type that facilitate the transfer of automotive vehicles to and from transport devices at stations where such devices are both loaded and unloaded.

More particularly, this invention relates to an improved loading and unloading ramp structure which is especially suited for transferring automobiles and other automotive vehicles to and from railroad cars such as are now equipped with tracks that define decks for carrying automotive vehicles at three levels.

At present, twenty or more automobile transporting railroad cars to be loaded are coupled together on a spur and brought to a defined location against a conventional stop with the rearmost car in register with a single pivotal ramp loading device known as the "Buck" loader. This type of loader is equipped with hydraulic ramp adjusting means which is then operated to swing the forward end of its ramp to the level of the bottom deck defining tracks on the rearmost railroad car. Automobiles are then run one after the other up the ramp onto the bottom deck of the rearmost car, from whence they are driven forwardly through the string of cars to fill up the bottom decks of the entire string of cars.

It will be understood, of course, that railroad cars such as are now in use for automobile transport purposes are equipped with pivoted jumper tracks, one for each of the pair of tracks defining each deck, with the jumpers for each deck located at its opposite ends so as to be cooperable with jumpers on common level decks of adjacent cars. When loading or unloading, these jumper tracks are swung to horizontal operating positions at which they cooperate to define jumper ramps that span the spaces between adjacent coupled together railroad cars so that automobiles can be run from any deck of one car to the corresponding deck of the next car.

After loading of the bottom decks of the string of railroad cars in this fashion, the ramp is hydraulically operated to align its forward end with the middle deck of the rearmost railroad car, and all the middle deck automobiles are then loaded from the rear of the string of cars. Loading of the cars is completed after hydraulic operation of the ramp to align it with the upper deck of the rearmost railroad car to permit all of the upper deck automobiles to be loaded one after the other.

Unloading of the railroad cars is accomplished by reversing the process described above.

It will thus be seen that the transfer of automotive vehicles to and from the multi-level decks of railroad cars has heretofore been a time consuming task, not only because the automotive vehicles had to be loaded singly at each level, but also because of the need for adjustment of the loading ramp after completion of the loading and/or unloading of each level.

With this objection in mind, it is the purpose of this invention to provide loading and unloading apparatus for transport devices equipped to carry automotive vehicles at a plurality of levels, which apparatus features ramp means that provides for the simultaneous transfer of automotive vehicles to and from said plurality of levels on the transport devices.

More specifically, it is a purpose of this invention to provide loading and unloading apparatus of the character described which features three separate inclined ramps each leading forwardly and upwardly from ground level to a transfer deck at a different level at the front of the apparatus, and wherein two of said ramps have lower end portions which extend laterally to one side of the apparatus at locations spaced apart along its length.

Still another object of this invention resides in the provision of loading and unloading apparatus of the character described, with wheel means by which it can be moved bodily back and forth in directions normal to its length, so as to enable the apparatus to be aligned with each, in turn, of a plurality of railroad spurs.

In this connection, it is a further purpose of this invention to provide loading and unloading apparatus of the character described which incorporates power means that provides for self propulsion of the apparatus to each of a number of transfer stations.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a perspective view of loading and unloading apparatus constructed in accordance with this invention, viewing the same from the rear and one side thereof;

FIGURE 2 is a perspective view of the apparatus viewing the same from the front and said same side; and FIGURE 3 is an elevational view of he apparatus, viewing the same from the opposite side.

Referring now to the accompanying drawings, the numeral 5 generally designates the elongated supporting structure of the apparatus of this invention, which is here shown provided with means to define three downwardly and rearwardly inclined ramps R1, R2 and R3, which have their elevated forward ends in superimposed relation and terminating at different levels at the front end 6 of the apparatus.

The supporting structure 5, for example, can comprise a pair of opposite upright side frames generally designated 7 and 8, and a substantially horizontal base frame 9 of rectangular shape. The side frames rise from the longitudinal beams of the base frame, and each side frame is comprised of a number of upright posts and suitable diagonal bracing. The upright opposite posts 10 and 11 define the front end of the supporting structure and rise to its full height.

The forward end portions of each of the ramps R1, R2 and R3 provide transfer decks 12, 13 and 14, respectively, which are supported in substantially horizontal positions by the side frames with the deck 12 at the highest level, at top of the apparatus, the deck 14 at the lowest level but spaced a distance above the base frame, and the deck 13 at a level substantially midway between the top and bottom decks 12 and 14. The front ends of all of these decks are in vertical alignment and at levels corresponding to the levels at which automotive vehicles are carried on railroad cars. Hence, a railroad car in loading or unloading position in front of the apparatus will have the adjacent ends of its different decks in juxtaposition to the front ends of the superimposed decks 12, 13 and 14.

The ramp R1 extends downwardly and rearwardly from the top deck 12 for the full length of the supporting structure and has its rear end close to ground level at the rear of the base frame. The ramp R3, which terminates at its front in the bottom deck 14, has the shortest length. It is curved laterally outwardly toward its lower rear end and projects through an opening in the side frame 7 to dispose its rear close to ground level at a location spaced from the front of the apparatus a distance substantially equal to one-third its length. Hence, the outboard rear portion of the ramp R3 may be said to provide a side access to or an exit from the bottom deck 14, depending upon whether automotive vehicles are run up the ramp to the transfer deck 14 or down the ramp from its transfer deck.

The ramp R2 has an intermediate downwardly inclined portion behind the middle deck 13 that is contained wholly within the confines of the side frames 7 and 8, and which merges with a laterally outwardly curved rear portion that projects through an opening in the side frame 7 similarly to the ramp R3 but rearwardly thereof. The outboard rear portion of ramp R2 terminates close to ground level but at a location spaced from the front of the supporting structure a distance about equal to two-thirds its length. The outboard lower end portion of the ramp R2 can, of course, project to the side of the apparatus remote from the lower end portion of the ramp R3, but it is more convenient for loading and unloading automotive vehicles to have both ramps R2 and R3 project from the same side of the apparatus.

A pair of short jumper ramps 15 is preferably hingedly connected as at 16 to the rear extremity of each ramp R1, R2 and R3, to facilitate travel of automotive vehicles up and down those ramps.

It will be appreciated that each of the ramps R1, R2 and R3 can comprise suitably spaced apart but rigidly mounted tracks, as is customary in transport devices and especially in ramp structures by which said transport devices are loaded and unloaded. It will also be appreciated that the ramps can be provided by expanded metal sheets, as indicated in FIGURES 1 and 2, laid over and secured to suitable reinforcing framework; or by different combinations of tracks and expanded metal surface sheets. Expanded metal surfaces, of course, provide the best traction for the wheels of automotive vehicles that are run up and down the ramps, whether such surfaces are confined in the bottoms of spaced apart wheel receiving tracks or comprise the entire surface of the ramps.

According to this invention, the entire ramp structure is intended to be mounted on a number of parallel rails 17, embedded in a ground level platform or the like, with the rails extending normal to the ends of the tracks 18 of a number of parallel spur lines in a railway freight yard. The tracks 18 of each spur terminate along a line parallel to the tracks 17, just ahead of a rail car stop 19.

A number of wheels 20, carried by the base frame 9 for rotation on axes lengthwise of the apparatus, ride on the cross tracks 17 to support the apparatus for bodily movement across the ends of the spur tracks, to enable the apparatus to be brought into register with any of the spurs for transfer of automotive vehicles to and from multi-level freight cars thereon.

A prime mover 21, such as an electric motor, provides power for driving certain of the wheels on the base frame adjacent to the side frame 8. For this purpose, the motor 21 is suitable drivingly connected to an elongated drive shaft 22 journalled in bearings 23 carried by the base frame and extending lengthwise of the apparatus; and three adjacent wheels 20 intermediate the ends of the apparatus are in turn drivingly connected with the shaft 22 as by gears or equivalent torque transmitting means.

A jumper track 25 can be hingedly connected to each deck 12, 13 and 14, with the jumper tracks all located adjacent to one side frame as seen in FIGURE 2. These are cooperable with complementary jumper tracks on the rear car of a string of railroad cars to be loaded or unloaded, when swung to operative horizontal positions, to bridge the space between the decks 12, 13 and 14 and the rear of the tracks or other automobile supporting deck means on the railroad cars.

It will be appreciated, of course, that the ground engaging jumpers 15 and the deck jumpers 25 are swung to inoperative positions whenever the loading and unloading apparatus is to be bodily driven from one loading station to another.

From the foregoing description, together with the accompanying drawings, it will be readily apparent that this invention greatly facilitates the loading of automotive vehicles onto, and the unloading of such vehicles from, the decks of multi-level vehicle transport devices in that it enables loading and/or unloading at a plurality of levels to take place at the same time.

What is claimed as my invention is:

1. A tri-level loader and unloader for automotive vehicles, characterized by:
   (A) an elongated supporting structure having front and rear ends;
   (B) means on the front of the supporting structure providing superimposed top, bottom and intermediate decks all spaced from one another and above ground level;
   (C) and means comprising part of said supporting structure defining three separate inclined ramps, one for each of said decks and leading thereto,
      (1) said ramps extending rearwardly and downwardly from their respective decks,
      (2) and the lower end portions of two of said ramps extending laterally outwardly from the supporting structure at spaced locations along its length, to provide side entrances for the decks to which said two ramps lead.

2. The tri-level loader and unloader of claim 1, further characterized by:
   (A) said two ramps respectively connecting with the bottom and intermediate decks and extending laterally from the same side of the supporting structure.

3. The tri-level loader and unloader of claim 1, further characterized in that the ramp for the top deck extends continuously from the rear of the supporting structure to the top deck at the front thereof.

4. The tri-level loader and unloader of claim 1, further characterized by wheel means carried by the supporting structure for rotation on axes disposed lengthwise of the supporting structure so as to provide for bodily motion of the device in directions normal to its length.

5. The tri-level loader and unloader of claim 4, further characterized by power means carried by the supporting structure and drivingly connected with said wheel means so as to provide for self propulsion of the device.

6. Loading and unloading apparatus for facilitating the transfer of automotive vehicles to and from transport devices of the type that have means to support and carry automotive vehicles at a plurality of levels, comprising:
   (A) an elongated frame structure having front and rear ends;
   (B) means at the front end of the frame structure defining a plurality of superimposed decks, the front ends of which are in substantial vertical alignment and at levels substantially corresponding to the different levels at which vehicles are carried by the transport devices, so that the vehicle supporting means of a transport device in loading or unloading position in front of said frame structure will be in juxtaposition to the front ends of said superimposed decks; and (C) a plurality of inclined ramps on the frame structure, one for each of said superimposed decks and leading thereto, the lower end portions of said ramps terminating at a common level, and the lower end portion of one of said ramps being angled outwardly away from one side of the frame structure at a location intermediate its ends to provide a side entrance for the deck to which said outwardly angled ramp leads.

References Cited

UNITED STATES PATENTS

| | | | |
|---|---|---|---|
| 2,815,872 | 12/1957 | Graham | 14—72 X |
| 3,095,591 | 7/1963 | Buck | 14—72 |
| 3,301,146 | 1/1967 | Krug et al. | 94—1 |

JACOB L. NACKENOFF, *Primary Examiner.*